Aug. 21, 1923.   1,465,458
A. F. TOPPINS
REPLACEMENT SHAFT AND REAR AXLE SUPPORT FOR TRACTORS
Filed July 20, 1922   2 Sheets-Sheet 1
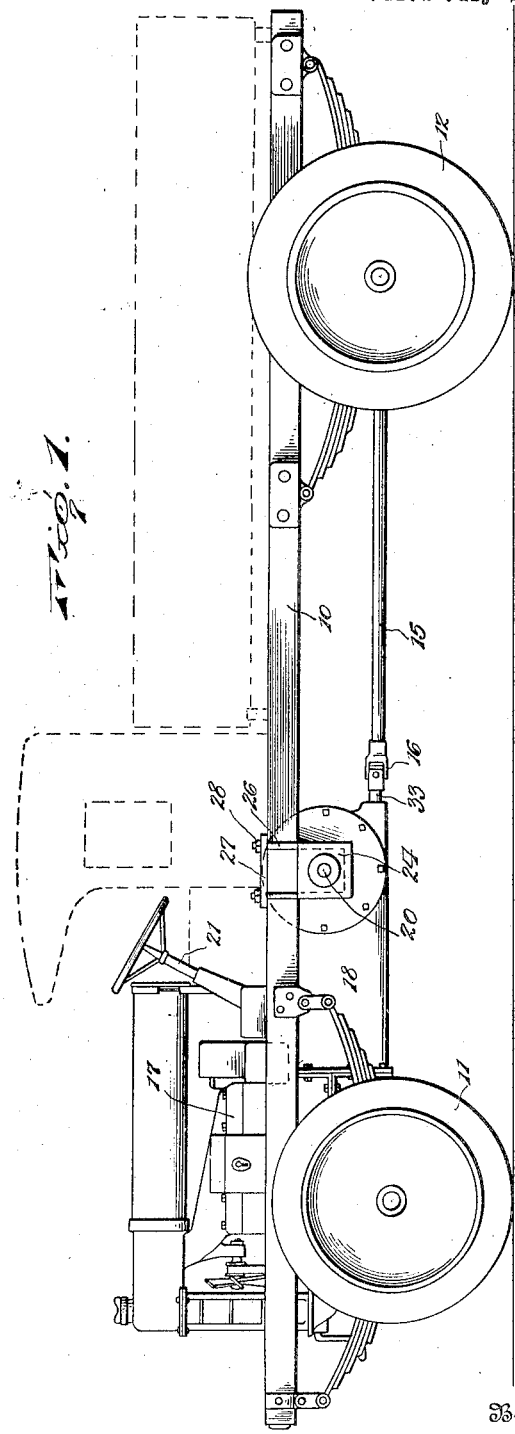
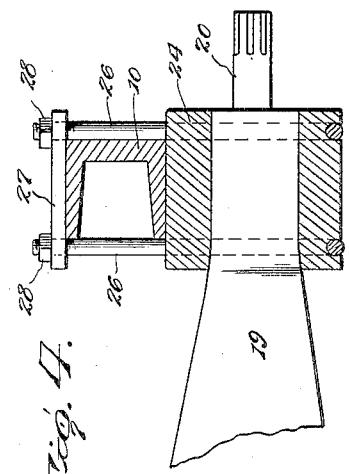
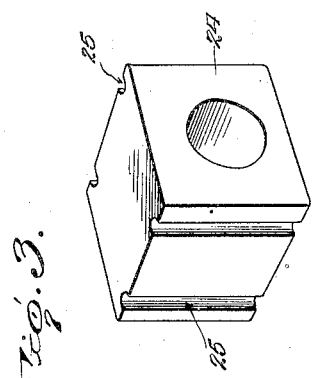
Inventor
A. F. Toppins.
By
Attorneys

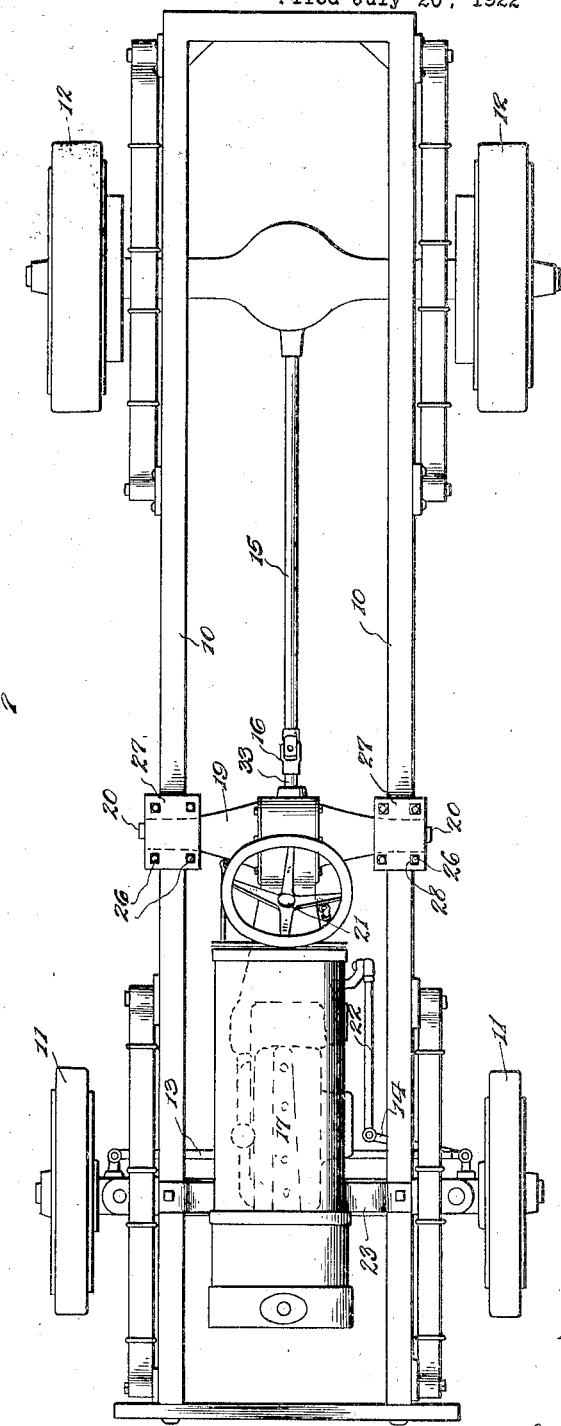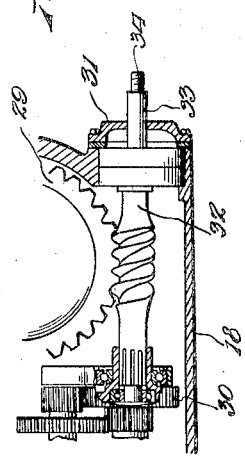

Patented Aug. 21, 1923.

1,465,458

UNITED STATES PATENT OFFICE.

ALEXANDER F. TOPPINS, OF WEST ALLIS, WISCONSIN.

REPLACEMENT SHAFT AND REAR-AXLE SUPPORT FOR TRACTORS.

Application filed July 20, 1922. Serial No. 576,341.

*To all whom it may concern:*

Be it known that I, ALEXANDER F. TOPPINS, citizen of the United States, residing at West Allis, in the county of Milwaukee and State of Wisconsin, have invented certain new and useful Improvements in Replacement Shafts and Rear-Axle Supports for Tractors, of which the following is a specification.

This invention relates to an improved worm replacement shaft and rear axle support for tractors and seeks, as one of its principal objects, to provide a means whereby the engine and driving mechanism of a tractor may be assembled upon a truck chassis and used as the power unit of the truck.

A further object of the invention is to provide means whereby the tractor engine may be rigidly and securely connected to the truck chassis.

And the invention has as a still further object to provide means whereby the tractor engine may be assembled upon the truck chassis and connected to the driving mechanism of the truck easily and quickly.

Other and incidental objects will appear hereinafter.

In the drawings:

Figure 1 is a side elevation showing a tractor engine assembled upon a truck in accordance with the present invention, Figure 2 is a plan view, Figure 3 is a perspective view showing one of the blocks employed for supporting the rear axle housing of the tractor engine, Figure 4 is a sectional view showing the manner in which the rear axle housing of the engine is connected to the truck frame, and Figure 5 is a fragmentary section showing the worm replacement shaft employed in connection with the tractor engine.

In rural districts, a tractor can generally be used only for a portion of the year and this is partially true of a truck. Accordingly, a farmer who has invested in both a truck and tractor is deprived of the benefit of his investment in each for a portion of the year. The present invention, therefore, seeks to provide a means whereby the original investment of the farmer may be reduced to a tractor and truck chassis and wherein by using the tractor engine upon the truck chassis, the tractor engine may be employed throughout the year.

Referring now more particularly to the drawings, I have illustrated a conventional truck chassis comprising a frame having side bars 10. The front wheels of the chassis are indicated at 11 and the rear wheels at 12. Associated with the front wheels is a connecting rod 13 for steering said wheels and extending laterally from the steering arm of one of the wheels is an arm 14. Extending forwardly from the rear axle housing of the chassis is a propeller shaft 15 equipped at its forward end with a universal joint 16, the shaft 15 being rotatable for driving the rear wheels 12.

In conjunction with the truck chassis, I have illustrated the power unit of a Fordson tractor, the present invention being applicable to this as well as other makes of light weight tractors. The engine is indicated as a whole at 17 and extending rearwardly from the engine is the usual transmission housing 18. At the rear end of the transmission housing is the rear axle including a housing 19 in which is journaled the rear axle shaft 20 of the power unit. The usual steering column is indicated at 21 and connected with the steering column is a drag link 22.

In carrying the invention into effect, I remove the front axle and wheels from the power unit of the tractor as well as the rear wheels, when the power unit is, as best shown in Figure 2, positioned between the bars 10 of the truck chassis near the forward ends thereof. Extending transversely between said side bars is a cradle 23 detachably supporting said unit at its forward end. Snugly fitting over the ends of the rear axle housing 19 of the unit are blocks 24, one of which is shown in detail in Figure 3, and formed in the side faces of said blocks are grooves 25. As particularly brought out in Figure 4, the blocks seat flat against the lower faces of the bars 10 and engaging in the grooves 25 of the blocks to snugly straddle each of said bars are pairs of U-bolts 26. Connecting the upper ends of the U-bolts of said pairs respectively, are tie plates 27 which rest upon the upper sides of the bars 10 overhanging said bars to receive the U-bolts therethrough and threaded upon the bolts are nuts 28 adjustable for tightly binding the blocks 24 against the bars. Thus, the blocks will rigidly support the power unit at its rear end.

As is well known, the rear axle of a Fordson tractor comprises, as shown in Figure 5, a worm wheel 29 and normally coacting with said wheel is a worm shaft detachably engaged at its forward end with one of the transmission gears 30 while covering the rear end of the shaft is a cap 31. In the present instance, the usual worm shaft is removed and substituted in lieu thereof is a worm replacement shaft 32. The shaft 32 is identical with the customary shaft with the exception that the shaft 32 is formed at the rear end thereof with an extension 33 having a stud 34 thereon, the shaft 32 engaging at its forward end with the gear 30 and being journaled in the usual bearings provided for the customary worm shaft. The cap 31 is apertured to rotatably receive the extension 33 of the shaft therethrough and threaded upon the stud 34 is the universal joint 16 connecting the replacement shaft with the propeller shaft 15. Thus, as will be seen, when the engine 17 is operated, the shaft 32 will, when the transmission gears of the power unit are properly set, be turned for rotating the propeller shaft and accordingly driving the truck provided by the assembled power unit and truck chassis. In order that the truck may be guided, the drag link 22 of the unit is, as shown in Figure 2, connected to the arm 14 so that the steering column 21 may be turned in the usual manner for directing the front wheels of the truck. It will accordingly be seen that I provide a construction whereby the tractor power unit may not only be employed in its usual capacity for driving the tractor but may also be employed for driving the truck. A corresponding reduction in investment is thus obtained while, at the same time, deterioration of the power unit of the tractor through idleness will be avoided. Furthermore, attention is directed to the fact that the shaft 32 will drive the rear axle shaft 20 of the power unit so that a sprocket or pulley may be attached to the latter shaft for operating a grain hoist or other mechanical equipment.

Having thus described the invention, what is claimed as new is:

1. The combination with a chassis having a propeller shaft, of a transposed power unit including a rear axle normally comprising a worm shaft, and a shaft replacing the worm shaft of the rear axle connecting the rear axle with said propeller shaft.

2. The combination with a chassis having a propeller shaft, of a transposed power unit including a transmission and having an axle housing, blocks fitting over the ends of the housing, means securing the blocks to the chassis supporting the unit thereon, and means connecting the transmission of the unit with said propeller shaft.

In testimony whereof I affix my signature.

ALEXANDER F. TOPPINS. [L. S.]